March 23, 1954  R. A. SCARATO  2,673,047
FOLDABLE-WINGED CRAFT
Filed Jan. 11, 1951

INVENTOR.
RUSSELL A. SCARATO
By Dunnington Sutherland
ATTORNEYS.

Patented Mar. 23, 1954

2,673,047

UNITED STATES PATENT OFFICE 2,673,047

FOLDABLE-WINGED CRAFT

Russell A. Scarato, St. Louis, Mo.

Application January 11, 1951, Serial No. 205,469

5 Claims. (Cl. 244—49)

This invention relates to foldable-winged aircraft and has particular application to jet and rocket powered aircraft.

The greatly increased speed and the practically unlimited altitudes attainable by aircraft powered by jet and rocket engines have introduced many difficulties in aircraft design. Wings capable of providing sufficient lifting power to launch the craft are subject to such extreme stress at the so-called sonic barrier that they are liable to be torn from the body of the craft. On the other hand, wings capable of withstanding the stresses that are met have been so constructed as greatly to limit the maneuverability of the craft, even at low altitudes.

One of the objects of this invention is to provide an aircraft the wing characteristics of which may be varied in flight.

Another object of this invention is to provide such an aircraft in which the forces to which the wings of the aircraft are subjected while in flight are utilized to assist in the folding and extending of the wings.

Other objects will become apparent to those skilled in the art in the light of the disclosures of this specification.

In accordance with this invention, aircraft are provided having wings which are foldable and extendable when the craft is in flight, substantially axially of the aircraft to which they are attached. The wings may be so foldable as to form fins or stabilizers during the craft's flight, or so as to be recessed completely within the body of the craft when fully folded. A plurality of pairs of such wings are so arranged that the forces acting upon one pair counterbalance the forces acting upon another pair. Means for utilizing those forces to extend or fold all of the wings may also be provided.

Figure 2:
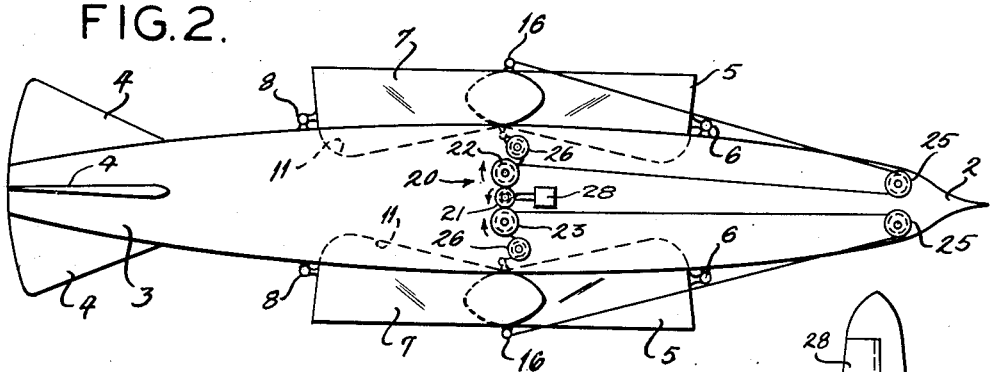
Figure 2 is a similar view of the craft as shown in Figure 1, showing the wings in folded position.
Figure 3:
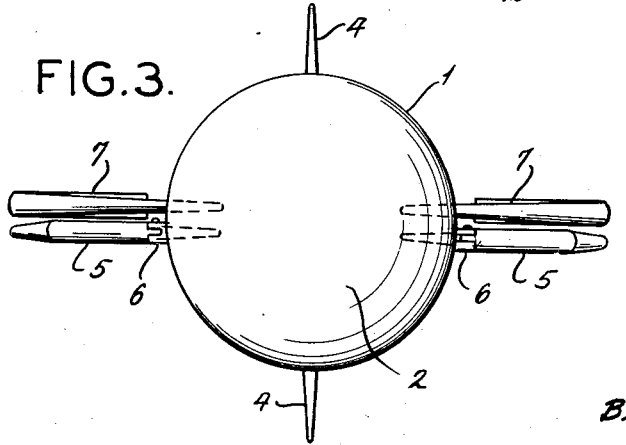
Figure 3 is a front view of the craft shown in Figure 2.
Figure 4:
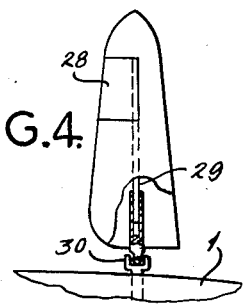
Figure 4 is a diagrammatic view partly in section showing one embodiment of control means for the wings.

Referring now to the drawing for an illustrative embodiment of this invention, the numeral 1 represents the fuselage of a jet or rocket craft, having a pointed nose 2 and a tail section 3 from which the hot gases from a rocket or jet engine issue. Horizontal and vertical stabilizing tail fins 4 may be provided. A pair of forward wings 5 are connected to the fuselage 1 by means of hinges 6. A pair of rear wings 7 are connected to the fuselage 1 by hinges 8. Front wing recesses 10 are formed in the fuselage 1 to accommodate front wings 5. Rear wing recesses 11 are formed in the fuselage to accommodate rear wings 7. In the illustrative embodiment shown, the folding and extending of the wings 5 and 7 are accomplished by cables 15, secured to the wings toward their outer tips by eyes 16. The other ends of cables 15 are attached to a winch designated generally as 20. The winch 20 is driven by a motor or other suitable power means, which may include manual power. The power means indicated diagrammatically at 23 in Figures 1 and 2, turn a central gear 21 which in turn rotates gears 22 and 23. Gears 22 and 23 drive cable drums around which the two cables 15 on each side wind. The cables 15 connected to the forward wings 5 extend forwardly from the wings toward the nose of the craft and return to the winch 20 around sheaves 25. The cables 15 connected with rear wings 7 also extend forwardly of those wings and are carried by sheaves 26. The length of the wings 5 and 7, in the embodiment shown, are such that the wings overlap when folded as shown in Figure 2, and, therefore, the front and rear wings are offset vertically with respect to one another, as shown in Figure 3. The hinges 6 are constructed so as to limit the forward travel of the forward wings 5 while the hinges 8 are so constructed as to limit the rearward travel of the rear wings 7.

Figure 1:
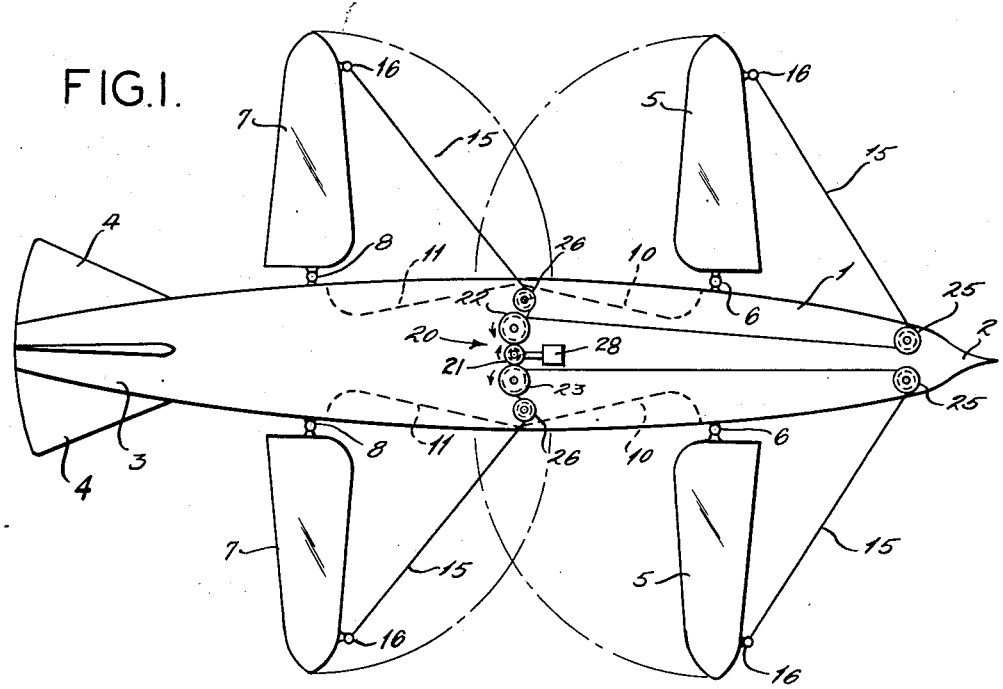
Figure 1 is a somewhat diagrammatic plan view of an aircraft constructed in accordance with one embodiment of this invention showing the wings extended.

In operation, assuming that the wings are extended as in Figure 1, a controlled launching of the plane can be accomplished along a runway or from a launching apparatus utilizing the lifting surface afforded by the extended wings. When the craft is airborne and has attained sufficient speed, the wings may be folded, as shown in Figures 2 and 3. It can be appreciated from the arrangement of the cables 15 and the winch 20 that the forces operating on the forward wings 5, when the craft is in flight, tending to fold them are counterbalanced by the forces acting upon rear wings 7 tending to extend them. Thus a relatively small power source is needed to fold the wings. Similarly, when the wings are to be extended in flight, as when the craft is about to land, the forces tending to extend the rear wings 7 are counterbalanced by forces tending to fold the forward wings 5. In the embodiment shown, the wings are folded by the shortening of the cable 15 attached to rear wings 7 and the paying out of the cable 15 attached to forward wings 5, when the central gear 21 is rotated counter-clockwise, as indicated in Figure 2, and extended by the paying out of the cable 15 attached to rear wings 7 and the shortening of the cables 15 attached to forward wings 5, when that gear is rotated clockwise, as indicated in Figure 1.

In the embodiment shown, the drag of the rear wings 7 is relied upon to extend those wings while the craft is in flight and the drag on the forward wings 5 is relied upon to fold those wings in flight. However, positive extending means for rear wing 7 and folding means for forward wings 5 may be provided as, for example, by running cables from the trailing edges of the wings to the cable drums. It is to be understood that the system of cables shown and described is merely illustrative of a simple control system. Links and levers positioned within the fuselage of the craft may be used to accomplish the folding and extending of the wings or an interconnected hydraulic system may be used. All of these systems, whereby the forces from one pair of wings are utilized directly to counterbalance the forces on another pair of wings, are embraced within the phrase "mechanical connections."

It is within the contemplation of this invention that movable wing flaps or tabs 28 be provided in forward and rear wings to allow the drag of the forward wings to be increased over that of the rear wings when the wings are to be folded, and to allow the drag in the rear wings to be increased over that of the forward wings when the wings are to be extended while in flight. An illustrative embodiment of mechanical means for operating such wing flaps is shown in Figure 6. A control rod 29, having a universal joint 30 to allow the rod to fold with the wing, may be manually operated to raise and lower the wing flap 28. In this figure the hinge 6 by which the wing is connected to the fuselage 1 is not shown. A splined or keyed sliding joint is provided in the rod 29 as shown to allow for the positioning of a hinge 6 having a different center of radius from the universal joint 30. In this way, a separate power source for moving the wings directly may be entirely eliminated except for the purpose of operating the wings while the craft is on the ground or when it has reached such a rarefied atmosphere that the drag on the wings has become negligible.

The positions of the two sets of wings relative to one another and to the fuselage may be varied. The wings may be aligned vertically above one another, as in the well-known biplane construction. They may even be so arranged that the forward wings fold forwardly while the rear wings fold rearwardly, so long as the two sets of wings fold in opposite directions so as to counterbalance one another. If the wings are aligned horizontally, they may be so shaped as to allow them to form, in effect, a single continuous fin on either side of the fuselage when folded.

Means may be provided by which the wings may be locked in their extended and folded positions, or in intermediate positions if it is desired to vary the effective lifting surface of the wings short of their fully folded or fully extended positions or otherwise to modify the wing characteristics.

In the embodiment illustrated, the hinges are indicated rather diagrammatically. In practice, bearing plates may be provided on either side of the wings to prevent excessive vibration, and the hinges will be suitably braced and constructed to take the strain to which they are subject. The hinges may also be recessed within the fuselage and may be so constructed that the motion of the wing in folding and extending is not a simple swinging motion. If the hinges are recessed and are connected to the rearwardly folding wings at their leading edges, the rearwardly folding wings may be folded so as to be entirely enclosed within the fuselage. Similarly, if the forwardly folding wings are hinged at their trailing edges and the hinges are recessed, the forwardly folding wings may be folded so as to be completely contained within the fuselage. Positioning of the hinges at the trailing edges of the rearwardly folding wings or at the forward edge of the forwardly folding wings will, of course, result in the full width of the wings extending outwardly from the hinged connections when the wings are in their folded positions. The embodiments of the drawings illustrate intermediate positions of the hinges.

It can be seen that, depending upon the shape of the wings, the position of the hinged connections with respect to the wings and the construction of the hinges, various wing characteristics at different positions of the wings from the fully extended to the fully folded positions may be obtained.

The folding and extending of the wings has been described as particularly useful in the launching and landing of the aircraft. However, the ability to modify the wing characteristics can be utilized to adjust to various conditions while in flight. For example, in piercing the so-called sonic barrier, the wings may be folded while the craft accelerates through the critical range and then be extended either partly or completely. In decelerating, the same procedure may be observed. Similarly, in operating in progressively more rarefied atmosphere, the wings may be extended more and more fully to compensate for the loss in buoyancy of the air.

Thus it can be seen that a simple, effective device is provided whereby the wing characteristics of a winged craft can be varied from those common to fully extended wings to those of mere fins or to no wings at all.

Having thus described my invention, what is claimed and desired to be secured by Letters Patent is:

1. In an aircraft provided with wings, wherein the wings are subjected to forces acting in a direction opposite to the direction of travel of the aircraft, while said aircraft is in flight, the improvement comprising two pairs of wings hingedly mounted on said aircraft for folding from an extended position substantially in a direction along the longitudinal axis of said aircraft, while the plane of said wings is maintained substantially constant, one of said pairs of wings being hinged to fold forwardly, the other, rearwardly; a mechanical connection between said pairs of wings, said mechanical connection being such that the forces, acting on said wings while the aircraft is in flight, tending to fold said rearwardly folding pair of wings, are substantially counterbalanced by the forces tending to extend said forwardly folding pair of wings.

2. The improvement of claim 1 wherein power means are provided, acting through the mechanical connections between the pairs of wings for folding and extending said wings.

3. In an aircraft provided with wings wherein the wings are subjected to drag while said aircraft is in flight, the improvement comprising two pairs of wings hingedly mounted on said aircraft for folding from an extended position substantially in a direction along the longitudinal axis of said aircraft, while the plane of said wings is maintained substantially constant, one of said pairs of wings being hinged to fold forwardly, the other, rearwardly; a mechanical connection between said pair of wings, said mechanical connection being such that the drag on said wings while the aircraft is in flight, tending to fold said rearwardly folding pair of wings is substantially counterbalanced by the drag tending to extend said forwardly folding pair of wings; and means for selectively increasing the drag of at least one pair of said wings.

4. The improvement of claim 3 wherein the means for selectively increasing the drag comprises wing tabs.

5. The improvement of claim 1 wherein the mechanical connection between the pairs of wings comprises cables connected to the leading edges of said wings and extending forwardly therefrom, and a common winch means to which the cables are connected, simultaneously to pay out to the rearwardly folding wings and to wind in from the forwardly folding wings in folding, and to pay out to the forwardly folding wings and to wind in from the rearwardly folding wings in extending said wings.

RUSSELL A. SCARATO.

References Cited in the file of this patent

UNITED STATES PATENTS

| Number | Name | Date |
|---|---|---|
| 1,009,770 | McKenzie | Nov. 28, 1911 |
| 1,249,593 | Bullinton | Dec. 11, 1917 |
| 1,506,867 | Schneider | Sept. 2, 1924 |
| 1,622,191 | Filippi | Mar. 22, 1927 |
| 1,903,303 | Tiling | Apr. 4, 1933 |
| 2,058,803 | Klemperer et al. | Oct. 27, 1936 |
| 2,410,239 | Roe | Oct. 29, 1946 |
| 2,501,920 | Steigel | Mar. 28, 1950 |